United States Patent Office 3,248,429
Patented Apr. 26, 1966

3,248,429
PHOSPHORUS POLYMERS
Charles F. Baranauckas and Irving Gordon, Niagara Falls, N.Y., assignors to Hooker Chemical Corporation, Niagara Falls, N.Y., a corporation of New York
No Drawing. Filed Dec. 3, 1962, Ser. No. 241,563
19 Claims. (Cl. 260—606.5)

This application is a continuation-in-part of U.S. patent application SN 70,379, filed November 21, 1960.

This invention relates to the preparation of organic phosphorus polymers.

Numerous processes have been developed in which organic phosphorus compounds containing phosphorus linked to a methylol group are polymerized with nitrogen compounds such as ammonia, amines, and the like. Cellulosic materials such as cellulosic textiles are impregnated with such polymers to impart flame-proofing properties to the material being treated. When an organic phosphorus halide compound such as tetrakis(hydroxymethyl)phosphonium chloride is used as a reactant in the formation of these polymers, a halogen acid, such as hydrochloric acid, is formed as a by-product of the polymerization reaction. Acids such as these weaken or tenderize the cloth or the cellulosic materials being treated. As a result, one may include with them a hydrogen halide acceptor, such as ammonium hydroxide, amines, and the like, to combine with hydrogen halide during polymerization. This technique is undesirable because undesirable acidic impurities are retained in the polymer under certain reaction conditions and, also, the use of an acid acceptor adds significantly to the cost of preparing the polymer.

It is an object of this invention to provide a process for preparing polymers of organic phosphorus compounds.

Another object of this invention is to provide novel organic phosphorus polymer compositions.

Still a further object of the invention is to provide an improved method for treating cellulosic materials with organic phosphorus polymers. These and other objects of the invention will be apparent from the following detailed description thereof.

It has been discovered that when tetrakis(α-hydroxyorgano)phosphonium compounds of the formula:

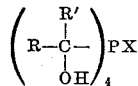

where R, R' and X are as defined below, are reacted with an aliphatic polyol, and heated to a temperature of between about 150 and about 200 degrees centigrade, while a suitable gas is passed through the resulting liquid, a linear poly α-hydroxy organo phosphorus ether is formed having flame-retarding properties. The poly α-hydroxy organo phosphorus ethers formed by this invention may possess one or more ether groupings (—C—O—C—) and one or more hydroxy radicals in addition to the hydroxy radical in the alpha position to the phosphorus.

Organic phosphorus compounds capable of being polymerized in accordance with the instant invention include tetrakis(α-hydroxyorgano)phosphonium halide compounds having the formula:

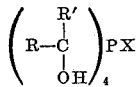

where R and R', are the same or different, and are selected from the group consisting of hydrogen, alkyl having between about 1 and 6 carbon atoms, alkenyl having between about 1 and 6 carbon atoms, aryl having between about 5 and 12 carbon atoms and cycloalkyl having between about 3 and 12 carbon atoms, and where X is a halogen such as chlorine, bromine, fluorine, or iodine. In this formula, X may also be an organic anion such as formate, acetate, benzoate, and the like.

Typical examples of suitable tetrakis(α-hydroxyorgano)phosphonium compounds are tetrakis(hydroxymethyl)phosphonium chloride, tetrakis(hydroxymethyl)phosphonium bromide, tetrakis(α - hydroxyethyl)phosphonium chloride, tetrakis(α-hydroxypropyl)phosphonium chloride, tetrakis(α-hydroxyallyl)phosphonium chloride, tetrakis(α - hydroxybenzyl)phosphonium chloride, tetrakis(α - hydroxymethylcyclohexyl)phosphonium chloride, and mixtures thereof.

Tertiary phosphine oxide compounds having the formula:

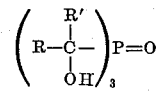

where R and R', are the same or different, and are as described above, may also be polymerized in accordance with the techniques of the instant invention. Typical examples of such suitable tertiary phosphine oxides include tris(hydroxymethyl)phosphine oxide, tris(α-hydroxyallyl)phosphine oxide, tris(α-hydroxybenzyl)phosphine oxide, and mixtures thereof.

Spiro tetrakis(α-hydroxyalkyl)phosphonium salts and the corresponding phosphines and phosphine oxides. Typical examples of suitable spiro tetrakis(α-hydroxyalkyl)phosphonium salts include spiro-1,5,7,11-tetrahydroxy-6-phosphazoniahendecane chloride, sprio - 1,4,6,9-tetrahydroxy-5-phosphazonianone chloride, spiro-1,5,7,11-tetrahydroxy-6-phosphazoniahendecane sulfate, spiro-1,5,7,11-tetrahydroxy - 6 - phosphazoniahendecane hydrogen sulfate, spiro - 1,5,7,11 - tetrahydroxy-6-phosphazoniahendecane dihydrogen phosphate, spiro - 1,5,7,11 - tetrahydroxy - 6 - phosphazoniahendecane nitrate, spiro-1,5,7,11-tetrahydroxy - 6 - phosphazoniahendecane acetate, and spiro-1,5,7,11-tetrahydroxy - 6 - phosphazoniahendecane tartrate.

Bis-α-hydroxy phosphonium salts and their corresponding phosphines and phosphine oxides may be utilized in the preparation of the polymers of this invention. The bis-α-hydroxy phosphonium salts suitable for utilization in this invention have the formula:

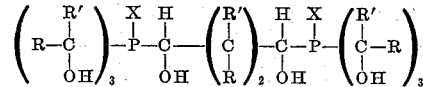

where R and R' are the same or different, and are as herein described, X is as herein described and Z is an integer from 0 to 6. Examples of suitable bis-α-hydroxy phosphonium salts are α,α'-dihydroxyalkylidene-bis-(tris-α-hydroxyalkyl)phosphonium halide, α,α'-dihydroxy trimethylene - bis(tri-α-hydroxymethyl)phosphonium chloride, α,α'-dihydroxy trimethylene-bis(tri-α-hydroxyethyl)phosphonium bromide, α,α'dihydroxy -tripropylene-bis-(tri-α-hydroxymethyl)phosphonium acetate, α,α' - dihydroxy trimethylene - bis(tri - α - hydroxypropyl)phosphonium bromide and the like.

Primary, secondary, and tertiary phosphines of the formula:

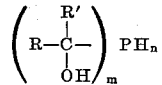

where R and R' are the same or different, and are as described above, m is 1 to 3, n is 0 to 2, and m+n=3, may also be polymerized in accordance with the technique of the instant invention. Typical examples of suitable phosphines include tris(hydroxymethyl)phosphine, tris-(α-hydroxyethyl)phosphine, tris(α - hydroxypropyl)phosphine, tris(α - hydroxyallyl)phosphine, tris(α - hydroxybenzyl)phosphine, and the corresponding primary and secondary phosphines.

Polyols which may be used in accordance with the techniques of the instant invention are pentaerythritol, dipentaerythritol, dichlorohydrin, ethylene, glycol, propylene glycol, trimethylene glycol, α-butylene glycol, β-butylene glycol, 1,3-butanediol, tetramethylene glycol, isobutylene glycol, 1,5-pentanediol, 3-methyl-1,3-butanediol, pinacol, 2-methyl-2,4-pentanediol, diethylene glycol, dimethylene glycol, dipropylene glycol, 2,2-dimethyl-1,3-butanediol, neopentyl glycol, trimethylol-propane, like polyols, and mixtures thereof.

While the instant invention may be applied to any of the above-mentioned polyols and organic phosphorous compounds, the invention will be described as applied to the above-mentioned pentaerythritol tetrakis(α-hydroxyorgano)phosphonium halide compounds for purposes of clarity.

The tetrakis(α - hydroxyorgano)phosphonium compounds, primary, secondary, and tertiary phosphines and phosphine oxides, the spiro-tetrakis(α-hydroxyalkyl)phosphonium compounds may be prepared by published methods, however, the bis-α-hydroxy phosphonium salts may be prepared by reacting a dialdehyde of the formula $CHO(CH_2)_{0-12}CHO$, phosphine, an aldehyde, and hydrogen chloride.

In the process of the instant invention, the tetrakis(α-hydroxyorgano)phosphonium halide compound is placed in a suitable container, provided with heating means, agitation means, and a means for bubbling an inert gas through the phosphonium halide compound during the polymerization reaction, together with the selected polyol, i.e., pentaerythritol. By-products of the polymerization reaction include a hydrogen halide gas, an aldehyde, and water vapor. These gaseous products are carried off from the product by the inert gas being bubbled through the reaction mass. At completion of the reaction, a linear polyether polymer has been formed.

The polymerization reaction may be represented by the following formula when pentaerythritol is utilized as the polyol.

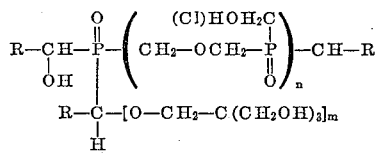

It is understood that this formula will vary depending upon the polyol and organic phosphorus compounds employed.

The tetrakis(α - hydroxyorgano)phosphonium halide compound may be added to the reaction vessel as a solid and then subsequently may be melted by heating, or it may be added to the reaction vessel as an aqueous solution. The polyol may be added to the reaction vessel in a similar manner. Of the solutions, it is preferred to utilize one containing from about 50 to about 95 percent by weight of the phosphonium halide compound, but more concentrated or more dilute solutions may be employed if desired. The polyol is added in proportion so as to be from 5 percent to 50 percent by weight of the reaction mixture.

The polymerization reaction is effected by heating the reactants in the reactant vessel to a temperature of between about 150 degrees and about 200 degrees centigrade, until polymerization is substantially complete. When the volume of the by-product gases of the hydrogen halide, the aldehyde, and water reaches a negligible level in the gas stream coming off the reaction vessel, polymerization is generally substantially complete. A concentration of these by-product gases in the off-gas stream can readily be determined by conventional techniques. For example, the volume of hydrogen chloride in the gas is readily indicated as being at a low level when moist litmus paper placed in the gas stream is no longer pink. The aldehyde concentration in the off gas is readily determined by the Fuchsin aldehyde test. Generally, substantially complete polymerization is effected between about four and eight hours of reaction, but various suitable polymerization reaction periods which are consistent with commercial operation may be employed.

Gases suitable for passing through the reaction mass during the polymerization reaction includes those gases which are inert under the reaction conditions employed, such as hydrogen, nitrogen, carbon dioxide, and mixtures thereof. Sufficient gas may be utilized to carry off substantially all of the gaseous by-products of the reaction.

It will be recognized by those skilled in the art that rates of gas passage through the reaction mass capable of carrying off a gaseous by-product may be employed. Generally, a gas rate sufficient to maintain a gas volume of between about 0.5 to about 10 percent of the liquid volume in volumes per minute will give satisfactory results.

The novel polymers produced in accordance with the instant technique may be used in place of phosphonium halide compounds, such as tetrakis(hydroxymethyl)phosphonium chloride, in the preparation of nitrogen-phosphorus containing polymers suitable for applying to cellulosic materials such as cellulosic textiles to flame-proof them. They may also be used in flame-proofing polyurethane foam compositions. If desired, the novel polymers of the instant invention may be applied directly to cellulosic materials such as paper, textiles, and then cured to yield flame-retarding coatings on the material being treated.

The following examples are presented to illustrate the invention more fully. They are not limiting.

*Example 1*

Tetrakis(α-hydroxymethyl)phosphonium chloride (3,700 parts) was melted at a temperature of about 100 degrees centigrade with nitrogen sparging. Trimethylolpropane (870 parts) was then added. An exothermic reaction occurred and heating was discontinued. After the exothermic reaction ceased, the mixture was heated, with stirring and nitrogen ebullition, to a temperature of about 175 degrees centigrade for about 6 hours.

A water-soluble, viscous polymeric syrup was recovered, which, when weighed, showed a 32 percent loss of weight from the starting charge. This represents an almost theoretical loss of weight. It analyzed 18.3 percent phosphorus content, and infrared analysis showed the product to be the desired polymer.

*Example 2*

Tetrakis(α - hydroxymethyl)phosphonium chloride (3,700 parts) was melted at a temperature of about 100 degrees centigrade with nitrogen sparging. Pentaerythritol (925 parts) was then added. An exothermic reaction occurred and heating was discontinued. After the exothermic reaction ceased, the mixture was heated, with stirring and nitrogen ebullition, to a temperature of about 175 degrees centigrade for about 6 hours.

A water-soluble, viscous polymeric syrup was recovered. Weight loss found, 37 percent, which was approximately the theoretical for the reaction herein indicated.

*Example 3*

Trihydroxymethyl phosphine oxide (100 parts) and trimethylol propane (28 parts) were reacted at a temperature of about 170 degrees centigrade with nitrogen sparging. After a slight exothermal evolution of heat, the mixture was heated, with stirring and nitrogen ebullition, for about 2 hours at a temperature of about 175 degrees centigrade.

A water-soluble, viscous polymeric syrup was obtained, which when weighed showed a 24 percent loss of weight from the starting charge. This represents an almost theoretical loss of weight. On analysis it showed 19.1 percent phosphorus content. Infrared analysis verified the identity of the product to be that described earlier.

*Example 4*

Trishydroxymethyl phosphine (6.53 parts) and glycerine (1.63 parts) were reacted with nitrogen sparging. After a slight exothermal evolution of heat, the mixture was heated, with stirring and nitrogen ebullition, for about 3 hours at a temperature of about 165 degrees centigrade.

A water-soluble, viscous polymeric syrup was obtained, which analyzed 20.3 percent phosphorus content. Infrared analysis indicated it to be a linear poly-α-hydroxy alkyl phosphorus ether and reaction weight loss verified this.

*Example 5*

A control urethane foam was prepared by heating 10 moles of trimethylolpropane with 6 moles of adipic acid to an almost nil acid number and a hydroxyl number of 504. This polyester was foamed with its own pre-polymer. The pre-polymer being a mixture of 20 percent of the above polyester and 80 percent of toluene diisocyanate. The mixture of the above two formulations was expanded with trichlorofluomethane in the normal manner to yield a 2.5 pounds per cubic foot density foam. The fire resistance of this foam was measured by a ASTM–D-757 Test, and the fire resistance of the foam was found to be about 10 inches per minute.

*Example 6*

The urethane foam formulation of Example 5 was again prepared, however, 7.5 percent of the tetrakis(α-hydroxymethyl)phosphonium chloride-trimethylolpropane polymer prepared in accordance with Example 1 was added. The fire resistance of the final urethane foam was measured by the method indicated in Example 5. The results of this test showed the fire resistance of the foam was about 0.42 inch per minute. The foam contained 1.38 percent phosphorus and .62 percent chlorine (calculated).

*Example 7*

To the urethane formulation of Example 5, 15.2 percent of the tetrakis(α-hydroxymethyl)phosphonium chloride-trimethylolpropane polymer prepared in accordance with Example 1 was added. The fire resistance of the final urethane foam was measured by the ASTM–D-757 Tester and showed .30 of an inch per minute. The foam contained 2.78 percent phosphorus and 1.52 percent chlorine (calculated).

*Example 8*

Example 5 was again repeated to prepare a urethane foam, however, it included 7.4 percent of the tetrakis(α-hydroxymethyl)phosphonium chloride pentaerythritol polymer as prepared by Example 2. The foam was then tested for fire resistance by the same method as utilized in testing the foams in Examples 5, 6, and 7, and the measurement recorded was .43 of an inch per minute. The foam contained 1.4 percent phosphorus and .66 percent chlorine (calculated).

Examples 5, 6, 7, and 8 indicate that the fire resistance is unobviously greatly enhanced by utilizing the polymers prepared by the method hereinabove described.

It is, therefore, evident that the poly-α-hydroxy organo phosphorus ethers formed by heating an organic phosphorus compound selected from the group consisting of (α-hydroxyorgano)phosphonium compounds of formulae

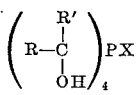

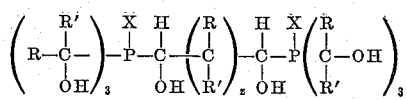

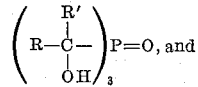

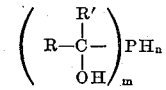

wherein R, R′ and X are as hereinabove described, wherein $m$ is 1 to 3, $n$ is 0 to 2, and $m+n=3$, and Z is an integer from 0 to 6, and an aliphatic polyol to a temperature between about one hundred and fifty and about two hundred degrees centigrade until polymerization is substantially complete, while passing through the reaction mass a gas inert thereto, when added to a urethane foam will impart an excellent fire resistance character to the foam. The percent of the poly-α-hydroxy organo phosphorus ethers formed which may be suitably added to a urethane foam formulation may vary between about 5 percent and 25 percent. The more suitable range being between about 7 percent and 16 percent.

The invention has been described with respect to preferred embodiments thereof but is not to be construed as limited thereto. Variations of the invention may be made and equivalents may be substitued therein without going beyond the invention or the scope of the claims.

We claim:

1. A process for preparing poly-α-hydroxy organo phosphorus ether which comprises: heating an organic phosphorus compound selected from the group consisting of phosphorus compounds of formulae

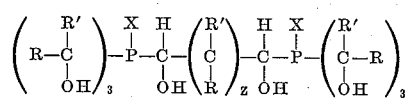

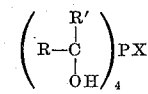

where Z is an integer from 0 to 6,

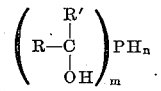

wherein $m$ is 1 to 3, $n$ is 0 to 2, and $m+n=3$,

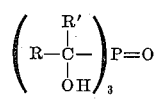

and spiro-tetrakis(α-hydroxyalkyl)phosphonium salts, where R and R′ are selected from the group consisting of hydrogen, alkyl having between about 1 and 6 carbon atoms, alkenyl having between about 1 and 6 carbon atoms, aryl having between about 6 and 12 carbon atoms, and cycloalkyl having between about 3 and 12 carbon atoms, and X is selected from the group consisting of chlorine, bromine, fluorine, iodine, and an organic anion, with an aliphatic polyol to a temperature between about one hundred and fifty and about two hundred degrees centigrade until polymerization is substantially complete, while passing through the reaction mass a gas inert thereto.

2. A method for preparing a tetrakis(α-hydroxyorgano)phosphonium halide polymer which comprises:

heating a tetrakis(α-hydroxyorgano)phosphonium halide compound of formula

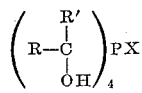

where R and R' are selected from the group consisting of hydrogen, alkyls having between about 1 and 6 carbon atoms, alkenyls having between about 1 and 6 carbon atoms, aryls having between about 6 and 12 carbon atoms, and cycloalkyls having between about 3 and about 12 carbon atoms, and X is a halogen selected from the group consisting of chlorine, bromine, fluorine and iodine; together with an aliphatic polyol to a temperature between about one hundred and fifty and about two hundred degrees centigrade until polymerization is substantially complete, while passing a gas inert to the reaction mass through the reaction mass until polymerization is substantially complete, the amount of said inert gas passed through said reaction mass being at least sufficient to carry off substantially all of the gaseous by-products of the reaction.

3. The process of claim 2 wherein said phosphonium halide compound is tetrakis(hydroxymethyl)phosphonium chloride.

4. The process of claim 2 wherein said phosphonium halide compound is tetrakis(hydroxymethyl)phosphonium bromide.

5. The process of claim 1 wherein said gas is air.

6. The process of claim 1 wherein said gas is nitrogen.

7. The process of claim 1 wherein said gas is carbon dioxide.

8. The process of claim 1 wherein said gas is hydrogen.

9. The process of claim 2 wherein the aliphatic polyol is pentaerythritol.

10. The process of claim 2 wherein the aliphatic polyol is trimethanolpropane.

11. The polymer produced by the process of claim 2.

12. The polymer produced by the process of claim 2 wherein the phosphonium halide compound is a tetrakis-(hydroxymethyl)phosphonium halide.

13. The polymer produced by the process of claim 3.

14. The polymer produced by the process of claim 4.

15. The polymer produced by the process of claim 9.

16. The polymer produced by the process of claim 10.

17. The process in accordance with claim 1 wherein the organic phosphorus compound has the formula

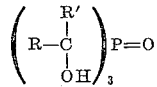

wherein R and R' are as described in claim 1.

18. The process in accordance with claim 1 wherein the organic phosphorus compound has the formula

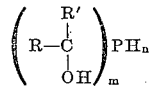

wherein R, R', m, and n, are as described in claim 1.

19. The process in accordance with claim 1 wherein the organic phosphorus compound is a spiro-tetrakis(α-hydroxyalkyl) phosphonium salt.

References Cited by the Examiner
UNITED STATES PATENTS

| | | | |
|---|---|---|---|
| 2,913,498 | 11/1959 | Ramsden | 260—606.5 |
| 3,007,884 | 11/1961 | Kaplan et al. | 260—2.5 |
| 3,013,085 | 12/1961 | Buckler | 260—606.5 |
| 3,026,275 | 3/1962 | Muller et al. | 260—2.5 |

TOBIAS E. LEVOW, *Primary Examiner.*

DONALD E. CZAJA, *Examiner.*

UNITED STATES PATENT OFFICE
CERTIFICATE OF CORRECTION

Patent No. 3,248,429                          April 26, 1966

Charles F. Baranauckas et al.

It is hereby certified that error appears in the above numbered patent requiring correction and that the said Letters Patent should read as corrected below.

Column 2, line 30, for "sprio" read -- spiro --; line 55, for "-tripropylene" read -- tripropylene --; column 3, line 5, for "ethylene," read -- ethylene --; line 14, for "phosphorous" read -- phosphorus --; column 3, lines 42 to 48, for the right-hand portion of the formula reading:

$$-CH-R \quad\quad\quad \text{read} \quad\quad\quad \begin{array}{c} -CH-R \\ | \\ OH \end{array}$$

line 65, for "reactant" read -- reaction --; column 4, line 66, for "trihydroxymethyl" read -- trishydroxymethyl --; column 6, lines 1 to 13, in the formula, for the subscript "z" read -- Z --; line 31, for "substittuted" read -- substituted --; column 6, lines 43 to 45, strike out

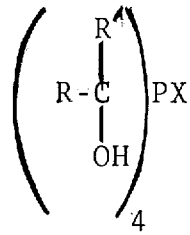

same column 6, after line 37, insert the following:

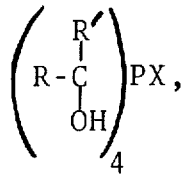

Signed and sealed this 26th day of September 1967.

(SEAL)
Attest:

ERNEST W. SWIDER                       EDWARD J. BRENNER
Attesting Officer                    Commissioner of Patents